(12) United States Patent
Oba

(10) Patent No.: US 8,165,088 B2
(45) Date of Patent: Apr. 24, 2012

(54) MIH PROTOCOL STATE MACHINE

(75) Inventor: Yoshihiro Oba, Englewood Cliffs, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 846 days.

(21) Appl. No.: 11/828,878

(22) Filed: Jul. 26, 2007

(65) Prior Publication Data

US 2008/0062926 A1    Mar. 13, 2008

Related U.S. Application Data

(60) Provisional application No. 60/825,567, filed on Sep. 13, 2006.

(51) Int. Cl.
*H04W 36/00* (2009.01)
(52) U.S. Cl. .................................. 370/331; 455/436
(58) Field of Classification Search .................. None
See application file for complete search history.

(56) References Cited

U.S. PATENT DOCUMENTS

| | | | | |
|---|---|---|---|---|
| 6,393,023 | B1 | 5/2002 | Shimizu et al. | |
| 6,614,810 | B1* | 9/2003 | Lee et al. | 370/471 |
| 7,584,397 | B2* | 9/2009 | Terry | 714/748 |
| 2002/0196769 | A1* | 12/2002 | Ohmi et al. | 370/343 |
| 2003/0067890 | A1 | 4/2003 | Goel et al. | |
| 2003/0123403 | A1* | 7/2003 | Jiang | 370/328 |
| 2005/0073977 | A1 | 4/2005 | Vanghi et al. | |
| 2005/0249161 | A1 | 11/2005 | Carlton | |
| 2006/0098574 | A1* | 5/2006 | Yi et al. | 370/236 |
| 2006/0099948 | A1 | 5/2006 | Hoghooghi et al. | |
| 2006/0140150 | A1* | 6/2006 | Olvera-Hernandez et al. | 370/331 |
| 2006/0187882 | A1 | 8/2006 | Kwak et al. | |
| 2006/0291423 | A1* | 12/2006 | Carlton | 370/331 |
| 2007/0072611 | A1* | 3/2007 | Feder et al. | 455/436 |
| 2007/0291792 | A1* | 12/2007 | Watfa et al. | 370/469 |
| 2008/0008131 | A1* | 1/2008 | Watfa et al. | 370/331 |

OTHER PUBLICATIONS

International Search Report dated Mar. 14, 2008.
International Preliminary Report, Mar. 26, 2009, pp. 1-6.
Canadian Office Action dated Jun. 27, 2011, issued in corresponding Canadian Patent Application No. 2,663,428.

* cited by examiner

*Primary Examiner* — Robert Scheibel
(74) *Attorney, Agent, or Firm* — Westerman, Hattori, Daniels & Adrian, LLP

(57) ABSTRACT

The preferred embodiments relate to, among other things, systems and methods for a media-independent-handover (MIH) Protocol State Machine. The present application provides, among other things, a MIH protocol state machine system and method for both source and receiver nodes. A system and/or method is described for facilitating media independent handover of a mobile node within or between network infrastructure, comprising: a media independent handover protocol state machine configured to provide states of a source node or a destination node during a transaction, said state machine addressing requests or responses both with and without an AckReq.

19 Claims, 15 Drawing Sheets

Figure 7: State Machine for MIH Request Source Node.

Figure 8: State Machine for MIH Request Destination Node.

Figure 9: State Machine for MIH Indication Source Node.

Figure 10: State Machine for MIH Indication Destination Node

MIH PROTOCOL STATE MACHINE

PRIORITY APPLICATIONS

The present application claims priority to U.S. provisional application number 60/825,567, filed on Sep. 13, 2006, the entire disclosure of which is incorporated herein by reference.

BACKGROUND

Background Discussion

Networks and Internet Protocol:

There are many types of computer networks, with the Internet having the most notoriety. The Internet is a worldwide network of computer networks. Today, the Internet is a public and self-sustaining network that is available to many millions of user. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e. the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media Independent Handover Services:

In I.E.E.E. P802.21/D.01.09, September 2006, entitled Draft IEEE Standard for Local and Metropolitan Area Networks: Media Independent Handover Services, among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems. For background reference and education purposes, portions of said I.E.E.E. 802.21 are reproduced below.

The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc). See, e.g., 1.1 of I.E.E.E. P802.21/D.01.09, September 2006, entitled Draft IEEE Standard for Local and Metropolitan Area Networks: Media Independent Handover Services, the entire contents of which document is incorporated herein into and as part of this patent application via being fully incorporated within PART C of the above-referenced provisional application. See Id.

General Architecture:

Introduction:

The IEEE 802.21 standard is intended to facilitate a variety of handover methods. Such methods are generally classified as 'hard' or 'soft', depending on whether the handover procedure is "break before make" or "make before break" with respect to the data transport facilities that support the exchange of data packets between the mobile node and the network. See Id.

In general, handover involves cooperative use of both mobile node and network infrastructure in order to satisfy network operator and end user needs. Handover control, handover policies and other algorithms involved in handover decision making are generally handled by communication system elements which do not fall within the scope of the IEEE 802.21 standard. However, it is beneficial to describe certain aspects of the overall handover procedure so that the role and purpose of MIH Event Service, MIH Command Service, MIH Information Service and MIHF in overall handover process is clear. See Id.

General Design Principles:

The IEEE 802.21 standard is based on the following general design principles.

a) MIH Function is a logical entity that helps and facilitates handover decision-making. Upper layers make handover decisions and link selection based on inputs and context from MIHF. Facilitating the recognition that a handover should take place is one of the key goals of MIHF. Discovery of information on how to make effective handover decisions is also a key component.

b) MIHF provides abstracted services to higher layers. From that perspective MIHF offers a unified interface to the upper layers. The service primitives exposed by this unified interface are based on the technology specific protocol entities of the different access networks. The MIHF communicates with the lower layers of the mobility-management protocol stack through technology-specific interfaces.

The specification of the MIHF interfaces with the lower layers generally does not fall within the scope of the 802.21 standard. Such interfaces may already be specified as service access points (SAPs) within the standards that pertain to the respective access technologies, such as IEEE 802.1, IEEE 802.3, IEEE 802.11, IEEE 802.16, 3GPP and 3GPP2. The 802.21 standard may contain recommendations to amend the existing access technology specific standards when modifications of the lower-layer interfaces may enable or enhance MIHF functionality.

c) Handover signaling (as part of handover execution and subsequent updates) may not be part of the standard. Different access networks support horizontal handover mechanisms (mobile initiated, network initiated, etc.). Handover initiation trigger may be useful in heterogeneous handovers when not done as per the homogeneous scheme.

d) MIHF may do further processing on MAC/PHY triggers and other related local events. Definition of this processing is outside the scope of the 802.21 standard. The standard shall provide support for remote events as well. Events are advisory in nature. The decision whether to cause a handover or not based on these events is outside the scope of the standard.

e) The standard shall specify mechanisms to support MN-initiated, MN-controlled, network-initiated and network-controlled handovers.

f) The standard may support transparent inter-working with legacy equipment. Thus IEEE 802.21 compatible equipment should be able to co-exist with legacy non IEEE 802.21 compliant equipment. See Id.

Media Independent Handover Reference Framework:

The following sections describe the points with regards to communication between different MIHF entities in the client device (MN) and the network. See Id.

MIHF functions communicate with each other for various purposes. The client device (e.g., a mobile node MN) exchanges MIH information with its MIH Point of Service (PoS). The MIHF in any Network Entity becomes an MIH PoS when it communicates directly with a MN based MIHF. An MIH Network Entity may not have a direct connection to the MN and therefore does not constitute an MIH PoS for that particular MN. The same MIH Network Entity may still act as MIH PoS for a different MN. MIHF communication may not take place on all L2 interfaces of an MIH capable MN. As an example, on an MIH capable MN with three L2 interfaces (such as, e.g., 802.11, 802.16, and 802.3), the 802.3 interface may be used only for system administration and maintenance operations, while the 802.11 and 802.16 interfaces may engage in the provision of MIHF services. The MN may use L2 transport for exchanging MIH information with an MIH PoS that resides in the same Network Entity as its Network PoA. The MN may use L3 transport for exchanging MIH information with an MIH PoS that may not reside in the same Network Entity as its Network Point of Attachment (PoA). The framework supports use of either L2 or L3 mechanisms toward communication among MIH network entities. See Id.

FIG. 11 shows an illustrative MIH communication model. The model shows MIHFs in different distinctive roles and the communication relationships amongst them. The communication relationship shown in FIG. 11 applies only to MIHFs. It is noted that each of the communication relationships in the communication model does not imply a particular transport mechanism. Rather, a communication relationship only intends to show that MIHF related information passing is possible between the two distinctive MIHFs. Moreover, 1) MIHF on the MN, 2) MIH PoS on the Network Entity that includes the serving PoA of the MN, 3) MIH PoS on the Network Entity that includes a candidate PoA for the Mobile Node (MN) (a candidate PoA is a PoA that the MN is aware of but not currently attached to; it becomes the target PoA if a handover eventually occurs), 4) MIH PoS on a Network Entity that does not include a PoA for the MN, 5) MIH non-PoS on a Network Entity that does not include a PoA for the MN. See Id.

The communication model also identifies the following communication reference points between different instances of MIHFs.

1) Communication reference point R1; Reference Point R1 refers to MIHF procedures between the MIHF on the MN and the MIH PoS on the Network Entity of its serving PoA. R1 may encompass communication interfaces over both L2 and L3 and above. MIHF content passed over R1 may be related to MIIS, MIES, or MICS.

2) Communication reference point R2; Reference Point R2 refers to MIHF procedures between the MIHF on the MN and the MIH PoS on the Network Entity of a candidate PoA. R2 may encompass communication interfaces over both L2 and L3 and above. MIHF content passed over R2 may be related to MIIS, MIES, or MICS.

3) Communication reference point R3; Reference Point R3 refers to MIHF procedures between the MIHF on the MN and the MIH PoS on a non-PoA Network Entity. R3 may encompass communication interfaces over L3 and above and possibly L2 transport protocol like Ethernet bridging, MPLS, etc. MIHF content passed over R3 may be related to MIIS, MIES, or MICS.

4) Communication reference point R4; Reference Point R4 refers to MIHF procedures between an MIH PoS in a Network Entity and an MIH non-PoS instance in another Network Entity. R4 may encompass communication interfaces over L3 and above. MIHF content passed over R4 may be related to MIIS, MIES, or MICS.

5) Communication reference point R5; Reference Point R5 refers to MIHF procedures between two MIH PoS instances in distinct Network Entities. R5 may encompass communication interfaces over L3 and above. MIHF content passed over R5 may be related to MIIS, MIES, or MICS. See Id.

Illustration of the MIH Communication Model:

A network model including MIH services is shown in FIG. 12 for greater illustration of the MIH Communication Reference Points. Moving from right to left, the model includes an MIH-capable mobile node (MN, far right) that supports multiple wired and wireless access technology options. The model assumes that the provisioning service provider either operates multiple access technologies or allows its user to roam into other networks when SLA in support of inter-working has been established. The MN has an MIHF implemented, which enables it to send specific MIH queries. The MN may have the information service partially implemented internally. See Id.

The model illustrates access networks that are connected in some loose, serial way to a core network (Operator 1-3 Core). Also depicted is an access network that is more tightly inter-worked or coupled (Access Network-3). The Operator 1-3 Core each might represent a service provider, corporate intranet provider or just another part of the visited or home access, or even core network. In this model, the provisioning provider is operating Access Network-3 coupled via R1 to a core (labeled Visited/Home Core Network). The terms Visited and Home are used to indicate the provisioning service provider or enterprise. Any of the illustrated networks could be both a visited or home network depending on the relation of the operator to the provisioner of the MN. See Id.

Network providers offer MIH services in their access networks (Access Network-1 to 4) to facilitate handover into their networks. Each access technology either advertises is MIH capability or responds to MIH service discovery. Each service provider for the access network allows access to one or more MIH Points of Service (PoS, compare with Communication Model). These PoS may provide some or all of the MIH services as determined during MIH capabilities discovery. The location or node of an MIH PoS is not fixed by the standard. The PoS location may vary based on operator deployment scenario and the technology-specific MIH architecture. See Id.

An MIH PoS may reside next to or be co-located with the point of attachment (PoA) in the access network (Access Network 1,2,4 are typical). Alternatively, the PoS may reside deeper inside the access or core networks (Access Network 3 is typical). As shown in FIG. 3, the MIH entity in the MN communicates with MIH network entities either by R1, R2 or R3 over any access network. When the PoA in the serving access network has a co-located MIH function, then an R1 reference connection terminates at the PoA which is also the PoS (MN to Access Network 1,2,4 of the model could all be R1). In that case, an R3 reference connection would be terminated at any non-PoA (also illustrated by MN to Access Networks 1, 2, 4). MIH events may originate at both sides of an active R1 link. The MN is typically the first node to react to these events. See Id.

The interaction of visited and home network could be either for control and management purposes or for data transport purposes. It is also possible that due to roaming or SLA agreements, the home network may allow the MN to access the public Internet directly through a visited network. As illustrated, two MIH network entities may communicate with each other via R4 or R5 reference connections. The MIH capable PoA may also communicate with other MIH network entities via R3 and R4 reference points. The MIH capable MN could have a MIH communication with other PoA in the candidate access networks via R2 reference point to obtain information services about the candidate network. See Id.

With regard to the MIH Information Service (MIIS), the providers offer access to their information server located in a MIH PoS node (upper far left). The operator provides the MIIS to mobile nodes so they can obtain pertinent information including but not limited to new roaming lists, costs, provider identification information, provider services, priorities and any other information that would enable to select and utilize services. As illustrated, it is possible for the mobile node to be pre-provisioned with MIIS data by its provider. See Id.

Also possible is for the mobile node to obtain MIH information services from any access network of its provider. MIIS could also be available from another overlapping or nearby network, using that network's MIIS point of service. A provisioner's network (depicted here as coupled with Access Network 3) may utilize R3 and R4 interfaces to access other MIH entities like the provisioner's or visited network's MIH information server. See Id.

With regard to the MIH Command Service (MICS), any of the Information Database may be also used as command service PoS. The MN MIHF typically communicates with this server using a layer three transport. See Id.

MIHF Services,

The MIHF provides asynchronous and synchronous services through well defined SAPs for link layers and MIH users. In the case of a system with multiple network interfaces of arbitrary type, the upper layers may use the Event service, Command service and Information service provided by MIH to manage, determine, and control the state of the underlying interfaces. See Id.

These services provided by MIH help the upper layers in maintaining service continuity, service adaptation to varying quality of service, battery life conservation, and network discovery and link selection. In a system containing heterogeneous network interfaces of 802 types and cellular 3GPP, 3GPP2 types, the Media Independent Handover Function may help the upper layers to implement effective procedures to couple services across heterogeneous network interfaces. Upper layers may utilize services provided by the MIHF across different entities to query resources required for a handover operation between heterogeneous networks. See Id.

MIH services in mobile devices facilitate seamless handover between heterogeneous networks. An MIH user such as a mobility management protocol (e.g., Mobile IP) could be supported for handover and seamless session continuity. This shall not preclude other protocols in addition to Mobile IP and even other upper layers from making use of MIH services to optimize handovers. See Id.

Mobile nodes employing MIH services would receive indications from link layers for asynchronous operations like Event service. The interaction with Command service and Information service will be through synchronous query and response type of mechanisms. The MIHF would also provide the functionality for the exchange of information between the network and host entities of the same media type. Note, if a mechanism for such information exchange already exists with a given type of media (such as with some cellular media types), the MIHF will make use of the existing mechanism whenever possible. See Id.

MIH Protocol:

The IEEE 802.21 standard supports the Media Independent Event service, Media Independent Command service and Media Independent Information service. The MIH Protocol defines the format of the messages (i.e. MIHF packet with header and payload) that are exchanged between remote MIHF entities and the transport mechanisms that support the delivery of the messages. The selection of the transport mechanism is dependent on the access technology that connects the MN to the network and the location of the MIH PoS. See Id.

The packet payload for these services may be carried over L2 management frames, L2 data frames or other higher layer protocols. Wireless networks such as 802.11 and 802.16 have a management plane and support management frames which could be suitably enhanced for carrying the above payloads. However, the wired Ethernet network does not have management plane and may carry the above payloads only in data frames. See Id.

The IEEE 802.21 standard defines the packet format and payloads in media independent manner in standard TLV format. Thereafter, these packets may be encapsulated in a L2 MIH Protocol using MIHF Ethertype when the payload needs to be sent over normal data frames as in case of Ethernet. In other cases, the TLV based messages and payload may be directly encapsulated in media specific management frames. Alternatively, MIH protocol messages may be encapsulated using a lower layer (e.g., L2) or a higher layer (e.g., L3 and above) transport. See Id.

The IEEE 802.21 standard defines the format of MIH Protocol data unit (PDU) header and payload. Standard TLV format provides media-independent representation for the PDU payload contents. The MIHF PDUs are encapsulated in data frames with MIHF Ethertype over 802 links. For 802.11 and 802.16 links, extensions of media-specific management frames are recommended for carrying MIH messages. No assumptions are made in the 802.21 standard regarding the transport of MIH messages over 3GPP and 3GPP2 access links at L2. See Id.

Media Independent Information Service:

Introduction:

Media Independent Information Service (MIIS) provides a framework by which an MIHF both in the mobile node and in the network may discover and obtain network information within a geographical area to facilitate handovers. The objective is to acquire a global view of all the heterogeneous networks relevant to the MN in the area to facilitate seamless handovers when roaming across these networks. See Id.

Media Independent Information Service includes support for various Information Elements (IEs). Information Elements provide information that is essential for a network selector to make intelligent handover decision. See Id.

FIG. 13 shows a high level description of scenarios that distinguish between two different types of mobility.

Depending on the type of mobility, support for different types of information elements may be necessary for performing handovers. For example, in case of horizontal handover across different PoAs of the same access network, information available from lower link layers of access network may be sufficient. In such cases, information elements like intra-technology neighbor reports and other link layer information required during handovers is directly available from the access network. In such cases, the availability of higher layer services offered by the network may not change appreciably across different network point of attachment. See Id.

On the other hand, during vertical handovers there is a need to select appropriate PoA in the new network based on both optimum link layer connectivity as well as availability of appropriate higher layer services to permit service and session continuity for active user applications. See Id.

Media Independent Information Service (MIIS) provides the capability for obtaining the necessary information for handovers. This includes information about lower layers such as neighbor maps and other link layer parameters as well as information about available higher layer services such as Internet connectivity, availability of VPN services, etc. The set of different higher layer services provided by the MIIS may constantly evolve. At the same time, the list of access networks that are supported by MIIS may also evolve. As such, there is a need for flexibility and extensibility in the way the MIIS provides support for different information elements. Towards this end, the MIIS defines a schema. The schema helps a client of MIIS to discover the capabilities of MIIS and also discover the entire set of different access networks and IEs supported by a particular implementation. Schema representation also allows the mobile node to query the information in a more flexible and efficient manner. As part of defining this schema, the MIIS may also identify a set of basic information elements that may define the core functionality of different implementations of MIIS. Other information elements as they are added may become part of the extended set of MIIS capabilities. See Id.

MIIS provides information about different access networks such as, e.g., 802 networks, 3GPP networks and 3GPP2 networks. The MIIS also allows this collective information to be accessed from any single network. See Id.

Thus, for example, using a 802.11 access network it may be possible to get information not only about all other 802 networks in a particular region but also that of, e.g., 3GPP and 3GPP2 networks as well. Similarly, using a 3GPP2 interface, it may be possible to get access to information about all 802 and 3GPP networks in a given region. This capability allows the mobile node to use its currently active access network and scan for other available access networks in a geographical region. Thus, a mobile node is freed from the burden of powering up each of its individual radios and establishing network connectivity for the purpose of accessing heterogeneous network information. MIIS enables this functionality across all available access networks by providing uniform way to retrieve heterogeneous network information in any geographical area. See Id.

Information Service Elements:

A notable goal behind the Information service is to allow mobile node and network entities to discover information that may influence the selection of appropriate networks during handovers. This information is intended to be primarily used by a policy engine entity that may make effective handover decisions based on this information. This information service is expected to provide mostly static type of information, although network configuration changes must also be accounted for. Other dynamic information about different access networks such as current available resource levels, state parameters, dynamic statistics, etc., should be obtained directly from the respective access networks. Some of the key motivations behind the Information Service are as follows:

1) Provide information about the availability of access networks in a geographical area. Further, this information could be retrieved using any wireless network, for example, information about a nearby WiFi hotspot could be obtained using a GSM, CDMA, or any other cellular network, whether by means of request/response signaling, or information that is specifically or implicitly broadcast over those cellular networks. Alternatively, this information could be maintained in an internal database by the MN.

2) Provide static link layer information parameters that could help the mobile devices in selecting the appropriate access network. For example knowledge of whether security and QoS are supported on a particular access network may influence the decision to select such an access network during handovers.

3) The link layer information comprising of neighbor reports and information about capabilities of different PoAs could also aid in configuring the radios optimally (to the extent possible) for connecting to available/selected access networks. For example, knowing about supported channels by different PoAs may help in configuring the channels optimally as opposed to scanning, beaconing etc. and then finding out this information. However, for most part, dynamic link layer parameters have to be obtained or selected based on direct interaction with the access networks and the Information Service may not be able to help much in that regard.

4) Provide an indication of higher layer services supported by different access networks and other relevant information that may aid in making handover decisions. Such information may not be available (or could not be made available) directly from MAC/PHY layers of specific access networks, but could be provided as part of the Information service. For example, in certain cases classification of different networks into categories such as public, enterprise, home, others, etc. may influence handover decision. Other information here may be more vendor/network specific in nature and could be specified in that form. See Id.

The information service elements are classified into three groups:

1) General Access Network Information: These information elements give a general overview of the different networks providing coverage within an area such as list of available networks and their associated operators, roaming agreements between different operators, cost of connecting to the network and network security and quality of service capabilities.

2) Information about Points of Attachment: These information elements provide information about different PoAs for each of the available access networks. These IEs include PoA addressing information, PoA location, data rates supported, the type of PHY and MAC layers and any channel parameters to optimize link layer connectivity. This may also include higher layer services and individual capabilities of different PoAs.

3) Other Information may be vendor/network specific, and could be specified appropriately. See Id.

Media Independent Handover Protocol:

Introduction:

The MIHF provides asynchronous and synchronous services through well defined SAPs for lower layers and upper layers. The services provided include the Event Service (ES), Command Service (CS), and Information Service (IS). Detailed description about MIH services are found in section 5.3. MIH SAPs include the MIH upper layer SAP, which is used by the users of MIH to gain access to various MIHF services, and MIH lower layer SAPs, which are used by MIHF to gain access and control of a variety of media dependent lower layer resources. See Id.

The MIH protocol defines frame formats for exchanging messages between peer MIHF entities. These messages are based on the primitives which are part of Media Independent Event service, Media Independent Command service and Media Independent Information service. IEEE 802.21 supports Media Independent Handover Function in mobile node, and network. The MIH Protocol allows peer MIHF entities to interact with each other. See Id.

In order for mobile node's MIHF entity to commence MIH protocol procedures, MIHF entity of mobile node may discover its peer remote MIHF entities. Peer remote MIHF entity is the correspondent MIHF entity with which MIHF of mobile node exchanges MIH protocol messages. Because peer remote MIHF entities reside in anywhere of the network, MIHF entity of mobile node may discover MIHF entity in the network before initiating MIH protocol procedure. This is done through the MIH Function Discovery procedure. See Id.

MIH Function Discovery can be done either at Layer 2 or Layer 3. However, this document only specifies how MIH Function Discovery is performed at Layer 2, when both MIH Functions are located within the same broadcast domain. MIH Function Discovery may be performed either through the MIH protocol (e.g., using L2 encapsulation such as LLC) or through media specific Layer 2 broadcast messages (e.g., 802.11 beacons, 802.16 DCD). MIH Function Discovery at Layer 3 is outside of scope of 802.21. See Id.

Once the peer MIHF has been discovered, the MN may discover the capabilities of the peer MIHF. This is done through the MIH Capability Discovery procedure. MIH Capability Discovery may be performed either through the MIH protocol or through media specific Layer 2 broadcast messages (i.e. 802.11 beacons, 802.16 DCD). See Id.

When the peer MIHF resides within the same broadcast domain as the MN, MIH Function Discovery can be performed using only MIH Capability Discovery. See Id.

Protocol Description:

The Media Independent Handover Protocol provides the following services:

1) MIHF Discovery (Layer 2 only): The MIHF in mobile node or in the network discovers which entity in the access networks supports MIHF.

2) MIH Capability Discovery: The MIHF entity discovers a list of supported events and commands, as well as supported query types for the Information Service.

3) MIH Remote Registration: Remote MIHF in different entities may register with each other to establish a new MIH session.

4) MIH Event Subscription: Interested entities may want to subscribe to a particular set of events from a given MIH-enabled entity.

5) MIH message exchange: Remote MIHF may exchange MIH messages using MIH payload and MIH protocol over a suitable transport. As part of message exchange the peer MIH Function entities may use the MIES, MICS and MIIS for effective handovers.

The standard describes the MIH frame format, message formats, and the procedures for MIH message exchange to facilitate handover in a media independent manner. However, handover policy and handover decision-making is outside the scope of the standard. See Id.

MIH Protocol Ack Operation:

A source MIH node may start a timer at the time of sending an MIH packet with the ACK-Req bit set and may keep a copy of the MIH packet while the timer is active. The value of the timer may depend on the RTT between the two nodes. If the acknowledgement packet is not received within the expiry of the timer, the source node may retransmit the saved packet immediately with same Message-ID (with ACK-Req bit set) and with the same Transaction-ID. If the source receives the ACK for the previous packet soon after retransmitting the same packet, then the source may determine successful delivery of the original packet and may not have to wait for any acknowledgement for the retransmitted packet. If the source received the acknowledgement before the timer expiry on original or any retransmitted attempt, then the source may reset the timer and release the saved copy of the packet. The source may at most make two retransmitted attempts in addition to the original attempt for the same message with the same Transaction-ID. The source shall not attempt to retransmit a packet with same Message-ID and Transaction-ID when the ACK-Req bit is not set in the original packet. See Id.

When a destination node receives an MIH packet with the ACK-Req bit set, then the destination returns an acknowledgement packet with ACK-Rsp bit set by, e.g., copying the Message-ID and Transaction-ID from the received packet. This packet may have no other payload. In instances where the destination may immediately process the received packet and a response is available, then the ACK-Rsp bit may be set in the MIH response packet. However, in this instance, the OpCode may indicate a response value. It is possible for a destination MIH node to set ACK-Rsp bit in an MIH response packet and additionally, act as a source node for the response packet and request MIH acknowledgement services by setting the ACK-Req bit. The destination may choose to buffer the original MIH packet header to correlate with any retransmitted packet(s) containing the same Transaction-ID for a small time duration whose value may be based on, for example, the RTT between the two nodes, to avoid duplicate processing of the same message. If such a retransmitted packet is received during this time period, the destination shall respond with an acknowledgement packet even though an acknowledgement message was sent earlier for the original packet. In any case, the destination shall not process the retransmitted packet if already done so, since it is a duplicate packet. If a destination receives an MIH packet with no ACK-Req bit set then no action is taken with respect to the MIH ACK protocol functionality. See Id.

MIH messages require reliability for remote communication on an end-to-end basis to ensure the receipt of data to the intended destination. It is particularly useful when the underlying transport used for remote communication does not provide reliable services. The nature of MIH communication may imply use of unacknowledged connection-less transport services to reduce transport overhead and ensure efficiency and reduced latency in the delivery of the MIH messages. Reliability may be provisioned with an optional acknowledgement service as part of the MIH protocol. The source end point may optionally request for an MIH ACK message to ensure successful receipt of a certain event, command or an information service message. MIH level ACK packet is used to acknowledge the successful receipt of MIH messages at the destination end point. When the MIH ACK is received by the source, it may conclude that the message was reliably delivered to the destination. If the message or the MIH ACK is lost, the source shall timeout and retransmit the same MIH message. See Id.

The optional MIH acknowledgement (ACK) capability is defined on top of the base MIH protocol. The MIH ACK capability is supported by use of two bits of information that are defined exclusively for ACK usage in the MIH header. The ACK-Req bit is set by the source MIH node and the ACK-Rsp bit is set by the destination MIH node. The underlying transport layer takes care of verifying the MIH message integrity. Verification of MIH message integrity is not required at MIHF level. See Id.

MIH Protocol Identifiers:

Following identifiers are used in MIH protocol messages: 1) MIHFID; 2) SessionID; and 3) Transaction ID

MIHF ID:

Media Independent Handover Function Identifier (MIHF ID) is an identifier that is required to uniquely identify MIHF end points for delivering the MIH services that are registered for it. MIH registration enables two MIH entities to create an MIH pairing based on the policies configured in the UE or after capability discovery mechanism. MIH network entities may not be able to provide any MIH services to the UE without this signaling from UE. Use of MIHF ID also enables the MIHF protocol to be transport agnostic. MIHF ID may be assigned to the MIHF during configuration process. See Id.

Session ID:

Session Identifier (Session ID) is assigned during a session establishment for remote registration. Each remote registration needs to be associated with the MIHF that keeps the registration information for particular MIH service. With reference to Session ID Value, a Session ID is a 32-bit random number that is unique within the pair MIHFs of the source and destination of session request. The Session ID is created jointly by the source and destination MIHF peers at the time of registration to avoid conflict at both ends. The source MIHF chooses the first 2 octets and the destination MIHF chooses the last 2 octets. The Session ID is used in all MIH messages that are generated from the destination MIHF. The Session ID is valid only during the lifetime of the registration. See Id.

Transaction ID:

Transaction Identifier (Transaction ID) is an identifier that is used with every MIH message exchange. This is required to match each request message that is sent by the initiator and its response message. This is also required to match each request response or indication message and its acknowledgment. This Identifier shall be created at the node initiating the transaction and it is carried over within the fixed header part of the MIHF frame. In order to handle the case of duplicate transaction identifiers at the responding node, this identifier is used in conjunction with the Session Identifier. See Id.

Link Indication:

A link indication involves information provided by the link layer to higher layers regarding the state of a link.

"The use of link indications within the Internet architecture has a long history. In response to an attempt to send to a host that was off-line, the ARPANET link layer protocol provided a "Destination Dead" indication, described in "Fault Isolation and Recovery" [RFC816]. The ARPANET packet radio experiment [PRNET] incorporated frame loss in the calculation of routing metrics, a precursor to more recent link-aware routing metrics such as Expected Transmission Count(ETX), described in "A High-Throughput Path Metric for Multi-Hop Wireless Routing" [ETX]. See Network Working Group article of B. Aboba, Ed., <draft-iab-link-indications-10.txt> dated Mar. 1, 2007 entitled "Architectural Implications of Link Indications."

Attempts have also been made to define link indications other than "Link Up" and "Link Down". "Dynamically Switched Link Control Protocol" [RFC1307] defines an experimental protocol for control of links, incorporating "Down", "Coming Up", "Up", "Going Down", "Bring Down" and "Bring Up" states. See Id.

"A Generalized Model for Link Layer Triggers' [GenTrig] defines "generic triggers", including "Link Up", "Link Down", "Link Going Down", "Link Going Up", "Link Quality Crosses Threshold", "Trigger Rollback", and "Better Signal Quality AP Available". IEEE 802.21 [IEEE-802.21] defines a Media Independent Handover Event Service (MIH-ES) that provides event reporting relating to link characteristics, link status, and link quality. Events defined include "Link Down", "Link Up", "Link Going Down", "Link Signal Strength" and "Link Signal/Noise Ratio". See Id.

Consider a proposal where a "Link Up" indication is used by a host to trigger retransmission of the last previously sent packet, in order to enable ACK reception prior to expiration of the host's retransmission timer. On a rapidly moving mobile node where "Link Up" indications follow in rapid succession, this could result in a burst of retransmitted packets, violating the principle of "conservation of packets." See Id.

Illustrative Architecture

FIG. 14 depicts some illustrative architectural components that can be employed in some illustrative and non-limiting implementations including wireless access points to which client devices communicate. In this regard, FIG. 14 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 15 shows an illustrative computer or control unit that can be used to implement computerized process steps, to be carried out by devices, such as, e.g., an access point, a user station, a source node or destination node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.) The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

SUMMARY

The preferred embodiments of the present invention improve upon the foregoing and other background technologies.

The preferred embodiments relate to, among other things, systems and methods for a media-independent-handover (MIH) Protocol State Machine. The present application provides, among other things, a MIH protocol state machine system and method for both source and receiver nodes.

According to some embodiments, a system and/or method is described for facilitating media independent handover of a mobile node within or between network infrastructure, comprising: a media independent handover protocol state machine configured to provide states of a source node or a destination node during a transaction, the state machine addressing requests or responses both with and without an AckReq.

Preferably, wherein the state machine includes an Abandon Timer that is configured to track a time to wait for a server response after a request is sent or after an ACK of the request is received. In addition, preferably the state machine includes a Cache Timer that is configured to provide at least one of: 1) a Cache ACK Timer that is configured to track a time to keep the ACK of a message in memory after sending an ACK for a client or source node state; and 2) a Cache Response Timer that is configured to track a time to wait before discarding a response for a server or destination node state. In some examples, a value of the Cache Timer is relevant to a retransmission timer as follows:

$$\text{Cache Timer}(\text{Cache } ACK \text{ Timer or Cache Response Timer}) > \sum_{0}^{Rtx.Max} (Rtx.timer)$$

where Rtx.timer is a retransmission timer that is configured to track the time to wait for an ACK before retransmitting a message, and where Rtx.Max is the maximum number of retransmissions. In preferred embodiments, the state machine is configured to address transactions in both MIH protocol operation and in session operation.

Preferably, the state machine includes an MIH Request Sender state machine component that employs a Retransmission Timer, an Abandonment Timer configured to track a time to wait for a server response after a request is sent or after an ACK of the request is received, and a Cache ACK Timer that is configured to track a time to keep an ACK of a message in memory after sending an ACK.

In some examples, the state machine is configured to establish the following MIH Request Sender states: Init; Sent; Processing; Completed and Terminated. Preferably, the state machine is configured such as to provide a Sent state of which a request message is sent, and such that the sender stays within this Sent state if a message needs to be retransmitted. Preferably, the state machine is configured such that the Sent state is transited once the sender receives a message from the server or abandons the request. Preferably, the state machine is configured such as to provide a Completed state in which a response with an AckReq was received. In addition, preferably the sender stays within this Completed state until a Cache ACK Timer, that is configured to track a time to keep the ACK of a message in memory after sending an ACK, expires. In addition, preferably the state machine includes a MIH Request Receiver state machine that employs a Retransmission Timer and a Cache Response Timer that is configured to track a time to wait before discarding a response.

In some examples, the state machine is configured to establish the following MIH Request Receiver states: Init; Processing; Completed; Completed Wait ACK and Terminated. Preferably, the state machine is configured such as to provide a Processing state of which a request was received, and wherein if the same request is received again, the receiver stays in this state, and wherein the state is transited when a response is sent. Preferably, the state machine is configured such as to provide a Completed Wait ACK state of which a response with an AckReq was sent, and wherein the receiver stays within this state until an ACK is received or a re-transmission mechanism is timed out. In addition, preferably the state machine is configured such as to provide a Completed state of which a request with an AckReq was received and a response without an AckReq was sent, and wherein the receiver stays in this state until a Cache Response Timer, that is configured to track a time to wait before discarding a response for a server state, expires.

In some examples, the state machine is configured such as to provide states for indication source and/or receiver nodes in relation to sending of messages with and without an AckReq bit set. Preferably, the state machine is configured such that if an MIH Indication message is sent without the AckReq bit set, the indication source node is transited to a first state, while if the MIH Indication message is sent with the AckReq bit set, the indication source node is transited to a second state to wait for an acknowledgement and upon receipt of the acknowledgement the indication source node transits to the first state. Preferably, the state machine is configured such that once an MIH indication is received, the MIH Indication destination node transits to a first state and if the MIH Indication is received without an AckReq bit set, the MIH Indication destination node transits to a second state and resets the transaction, while if the MIH indication is received with an AckReq bit set, the MIH Indication destination node sends an acknowledgement to the MIH Indication source node and waits in the first state to ensure if the same indication is received again.

In some other embodiments, a method for facilitating media independent handover of a mobile node within or between network infrastructure includes: with a media independent handover protocol state machine providing states of a source node or a destination node during a transaction, the state machine including an Abandon Timer is configured to track a time to wait for a server response after a request is sent or after an ACK of the request is received and a Cache Timer that is configured to track at least one of: 1) a time to keep the ACK of a message in memory after sending an ACK for a client state; and 2) a time to wait before discarding a response for a server state.

For reference, in some embodiments, a state machine includes, e.g., a component or module that stores the status of something at a given time and can operate on input to change the status and/or cause an action or output to take place for any given change. According to the preferred embodiments, the operation and functionality of a state machine can be implemented in software, hardware or firmware. In some embodiments, the state machine can be implemented within, e.g., Sender and/or Receiver Nodes or Source and/or Destination Nodes. In some embodiments, the state machine could involve or include processing carried out at or via another network entity.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DISCUSSION OF THE PREFERRED EMBODIMENTS

Figure 1:
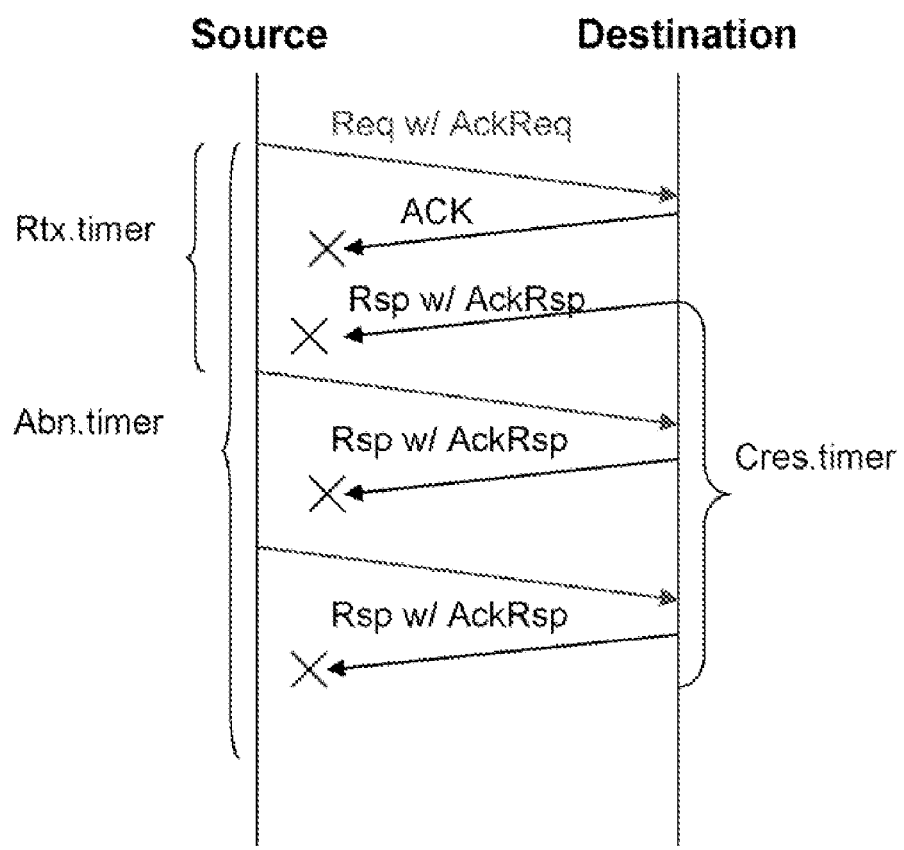
FIG. 1 is an illustrative communication flow diagram between a Source Node and a Destination Node according to some illustrative embodiments helping to illustrate the operation of an illustrative Cache Timer.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

The preferred embodiments relate to, among other things, a MIH Protocol State Machine. The present application provides, among other things, a MIH protocol state machine both for source and receiver nodes.

Introduction to the Preferred Embodiments:

With respect to 802.21, state transition diagrams are specified per MIH protocol specification in I.E.E.E. P802.21/D.01.09, September 2006, entitled Draft IEEE Standard for Local and Metropolitan Area Networks: Media Independent Handover Services, incorporated herein by reference in its entirety above. The preferred embodiments can, e.g., provide state machines that help MIH implementers. Among other things, the present State Machines can reflect all MIH Services. In some examples, aspects described herein could be implemented by inclusion as Annex in the I.E.E.E. P802.21 specification.

Design Considerations:

With reference to the above-incorporated discussion related to ACK requests and responses, the ACK request and response are used for providing reliability in sending/receiving MIH messages. In that regard, in situations in which the underlying protocol is reliable, such as TCP, the states that involve this ACK are not required.

With reference to existing/current state diagrams, it is noted that such state diagrams reflect only the transactions in the MIH protocol operation; the session operation is not considered. Additionally, requests received after the transaction is terminated with the same transaction ID are considered as new requests.

Timers:

According to some of the preferred embodiments, additional timer(s) is/are provided. In the above-noted D01-09, a retransmission timer has been defined.

In the present application, according to some preferred embodiments, two additional timers are introduced: 1) an Abandon Timer (Abn.timer); and 2) a Cache Timer.

In this regard, the "Abandon Timer (Abn.timer)" is used to track the time to wait for a transaction to be completed—such as, e.g., the 'Response' after a request is sent from the source node.

In addition, the 'Cache Timer' can include the following individual timers (or a single timer):

1) A "Cache ACK Timer" (Cack.timer) that is used to track time to keep the ACK of a message in a memory after sending the ACK, such that, e.g., in case the message is received again, the ACK can be re-sent. In the preferred embodiments, this is applicable to Client State only.

2) A "Cache Response Timer" (Cres.timer) that is used to track time to wait before discarding the response, after, e.g., its first transmission. In the preferred embodiments, this is applicable to Server State only.

As indicated above, in some embodiments, the Cack.timer and the Cres.timer can be equivalent and can be realized with a single timer.

Need for Cache Timer(s):

FIG. 1 is a communication flow diagram helping to illustrate the operation of an illustrative Cache Timer.

In this example, a Source initially transmits a Request w/ an AckReq. In reply, the Destination then transmits an ACK and Response w/ AckRsp. However, when the MIH is transmitting over an unreliable transport and the Destination's transmissions fail to reach the Source as depicted in FIG. 1, the Destination shall not treat the subsequent same request as a new transaction request—for example, when the subsequent same request is received within the time period of the Cres.timer as shown in the illustrative example.

With reference to FIG. 1, this corresponds to a) the "Sent" state described in the MIH Request Sender state diagram (see, e.g., below) and b) the "Completed" state described in the MIH Request Receiver state diagram (see, e.g., below).

It is noted that the preferred embodiments, the value of the Cache Response Timer is relevant to the Retransmission Timer as follows, $$\text{Cres.timer} > \sum_{0}^{Rtx.max} (Rtx.\text{timer})$$

Similarly, the Cache ACK Timer that is triggered in the "Completed" state of the Source State Diagram has a similar effect (see, e.g., below).

Timer Functions/Variables:

In the preferred embodiments, the Retransmission Timer (Rtx.timer) is configured to track: the time to wait for an ACK before retransmitting message.

In the preferred embodiments, the Abandon Timer (Abn.timer) is configured to track: the time to wait for a server response after a request is sent or after the ACK of the request is received.

In the preferred embodiments, the Cache ACK Timer (Cack.timer) is configured to track: the time to keep the ACK of a message in a memory after sending the ACK response, in case the message is received again and the ACK should be re-sent.

In the preferred embodiments, the Cache Response Timer (Cres.timer) is configured to track: the time to wait before discarding the response, after its first transmission.

In the preferred embodiments, the Retransmission Count (Rtx.count) variable is defined as equal to: the number of retransmissions that have occurred. On the other hand, in the preferred embodiments, the Maximum Retransmission Count (Rtx.max) variable is defined as equal to: the maximum number of retransmissions. Moreover, as set forth above, the value of the Cack.timer and/or the Cres.timer can be depicted as follows.

$$\text{Cack.timer or Cres.timer} > \sum_{0}^{Rtx.Max} (Rtx.\text{timer})$$

MIH State Diagrams:

With reference to the state diagrams shown in the attached FIGS. 2-6, each State Diagram represents one single transaction.

In the exemplary situations described herein, the following cases are addressed:

a) First, cases involving an MIH Request Sender in which:
a Client sends a Request w/ or w/o an AckReq;
a Client receives a Response w/ or w/o AckReq.

b) Second, cases involving an MIH Request Receiver in which:
a Server receives a Request w/ or w/o an AckReq;
a Server responds w/ or w/o an AckReq.

c) Third, cases involving an MIH Indication Sender.

d) Fourth, cases involving an MIH Indication Receiver

Figure 2:
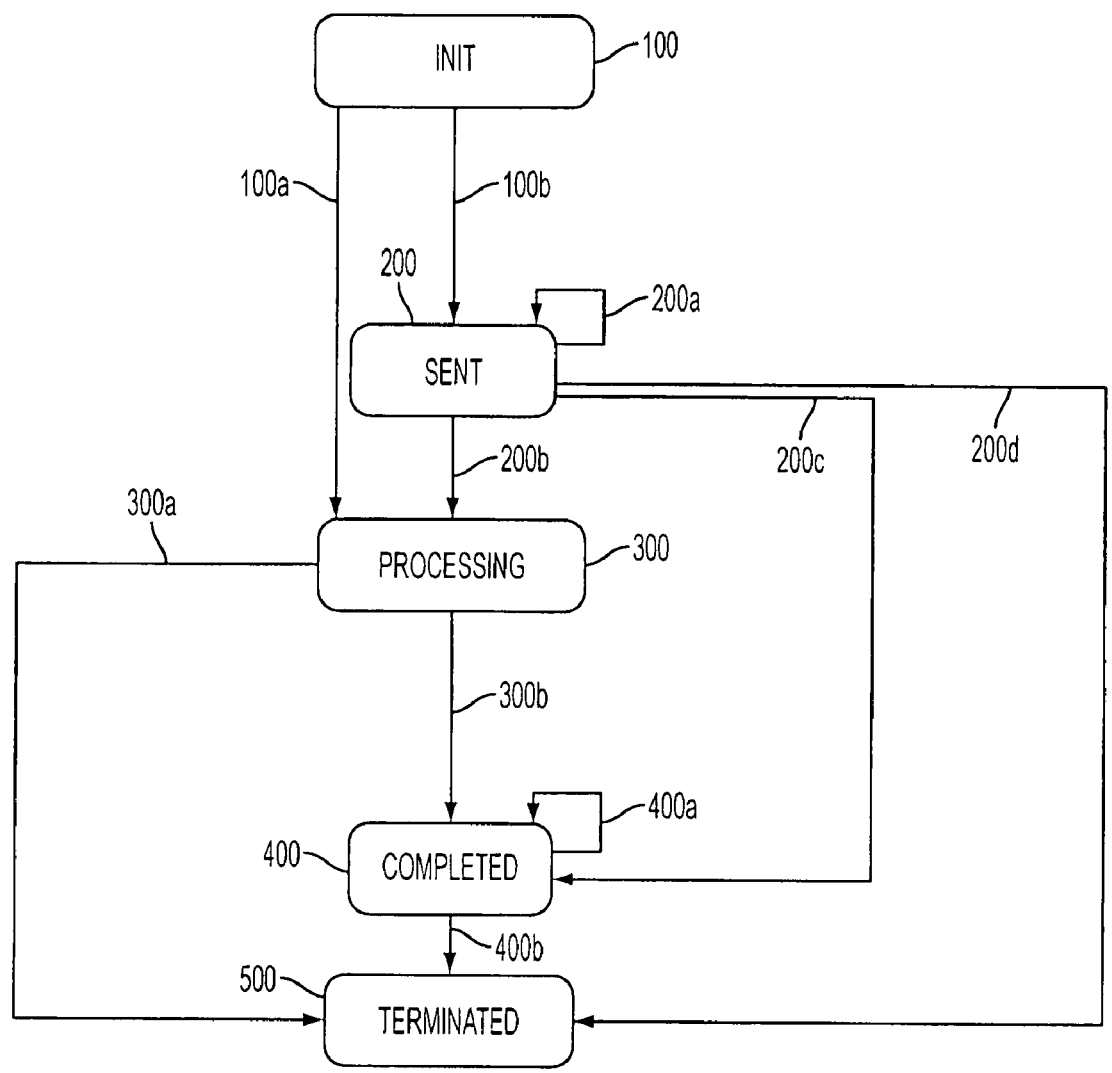
FIG. 2 is a flow diagram depicting MIH Request Sender (Source Node) states according to some illustrative embodiments.

MIH Request Sender (Source Node):

With reference to FIG. 2, this figure shows a flow diagram depicting MIH Request Sender (Source Node) states. As shown in FIG. 2, the figure addresses the following cases: 1) client sends Req. w/ AckReq—Server responds w/AckReq; 2) client sends Req. w/ AckReq—Server responds w/o AckReq; 3) client sends Req. w/o AckReq—Server responds w/AckReq; and/or 4) client sends Req. w/o AckReq—Server responds w/o AckReq. In this illustrative example, the following timers are used: 1) an Rtx.timer; 2) an Abn.timber; and 3) a Cack.timer.

With reference to FIG. 2, the following states are depicted: Init; Sent; Processing; Completed; and Terminated.

With reference to the "Init" state, the Init state is the initial state before the transaction start.

With reference to the "Sent" state, the Sent state is state of which a request message is sent. In this regard, if this message needs to be retransmitted, the client still stays at this state. In addition, once the client receives a message from the server or abandons the request, the state is transited.

With reference to the "Processing" state, the Processing state is a state of which the client is waiting for a response. In this regard, once the client receives a response or abandons the request, the state is transited.

With reference to the "Completed" state, the Completed state is a state in which a response with an AckReq was received. In this regard, the client stays in this state until the Cache Ack timer expires.

With reference to the "Terminated" state, the Terminated state is a final state in which the transaction is terminated. In this regard, the system can notify the application if transaction fails.

Referring to the flow diagram in FIG. 2, as shown, the Source Node is initially in state Init 100. Here, either of the following occurs: a) at 100a, a request is sent without AckReq and the Abn.timer is started, and the Source Node proceeds to the Processing state 300, or b) at 100b, a request is sent with an Ack Req and the Rtx.timer is started, with Rtx.count=0, and the Source Node proceeds to Sent state 200.

From the Sent State 200, either of the following occurs: a) at 200a, where the Rtx.timer expires and the Rtx.count<Rtx.max, the request is retransmitted, and the Rtx.timer is restarted, with Rtx.count++; b) at 200b, ACK message is received, and the Rtx.timer is stopped, and the Abn.timer is started; or c) at 200c, a response is received with an AckReq, response, response is passed to the MIH User, the ACK is sent, and Cack.timer is started; or d) at 200d, a response is received without AckReq, response is passed to MIH User, transaction is ended; Rtx.timer expires and Rtx.count equal Rtx.max, and transaction is ended.

As shown and described above, from 100a or 200b, the Source Node is in the Processing State 300. Here, either of the following occurs: a) at 300a, a response is received without an AckReq, response is passed to the MIH User, and the transaction is ended; the abn.timer expires, and the transaction is ended; b) at 300b, a response with an AckReq is received, response is passed to MIH User, ACK is sent, Abn.timer is stopped, and Cack.timer is started.

From the Completed State 400, either of the following occurs: a) at 400a, a duplicate response is received, and the ACK is retransmitted; b) at 400b, the cack.timer expires and the state proceeds to Terminated State 500.

Figure 3:
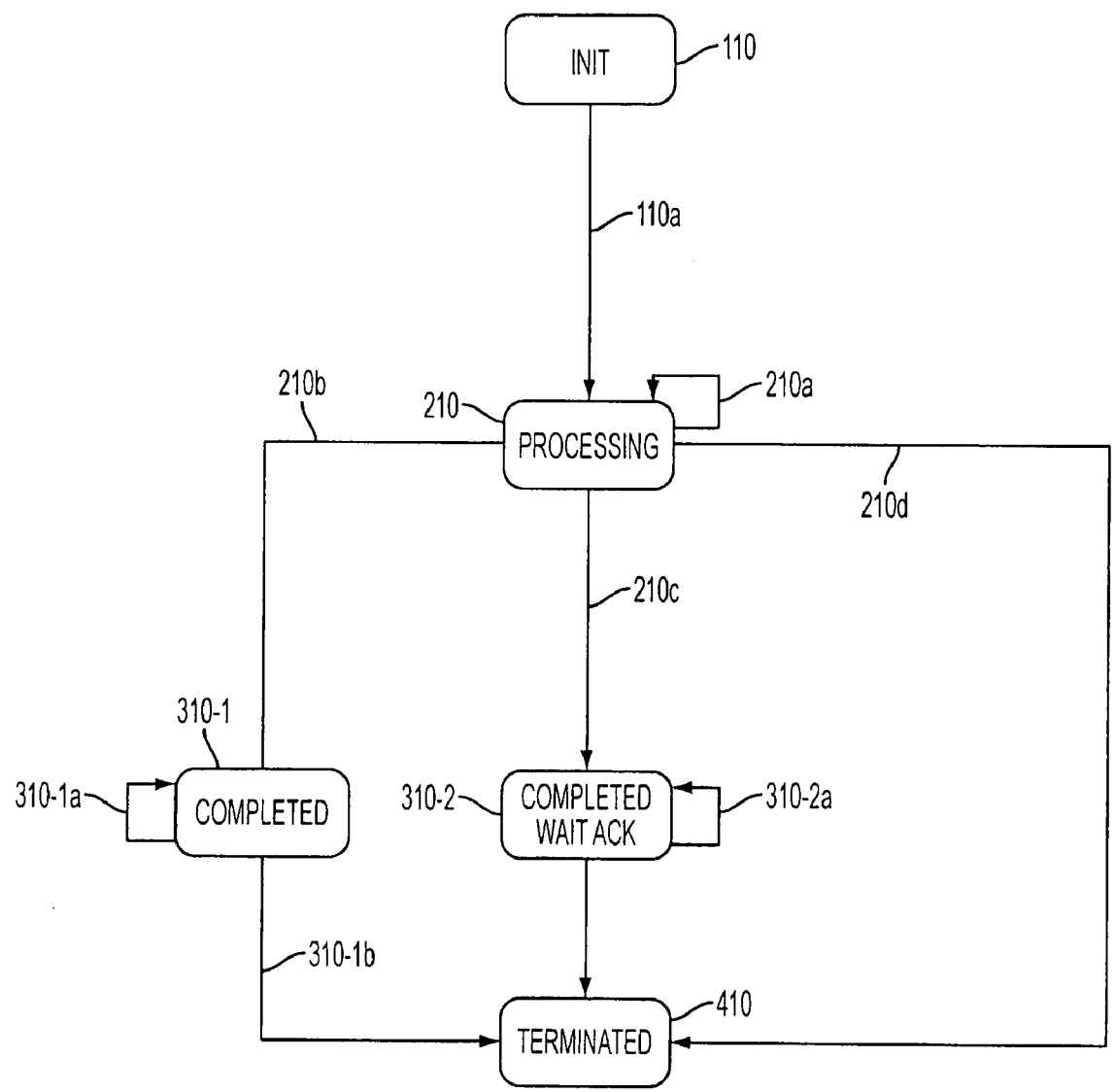
FIG. 3 is a flow diagram depicting MIH Request Receiver (Destination Node) states according to some illustrative embodiments.

MIH Request Receiver (Destination Node):

With reference to FIG. 3, this figure shows a flow diagram depicting MIH Request Receiver (Destination Node) states. As shown in FIG. 3, the figure addresses the following cases: 1) server receives Req. w/o AckReq—Server responds w/AckReq; 2) server receives Req. w/ AckReq—Server responds w/ AckReq; 3) server receives Req. w/ AckReq—Server responds w/o AckReq; and/or 4) server receives Req. w/o AckReq—Server responds w/o AckReq. In this illustrative example, the following timers are used: 1) an Rtx.timer; 2) Cres.timer.

With reference to FIG. 3, the following states are depicted: Init; Processing; Completed; Completed Wait Ack; and Terminated.

With reference to the "Init" state, the Init state is a state before the transaction starts.

With reference to the "Processing" state, the Processing state is a state of which a request was received. In this regard, if the same request is received again, then the server stays at this state. Here, the state is transited when a response is sent.

With reference to the "Completed Wait ACK" state, the Completed Wait ACK state is the state of which a response with AckReq was sent. In this regard, the server stays in this state until an ACK is received or a re-transmission mechanism is timed out.

With reference to the "Completed" state, the Completed state is the state of which a request with an AckReq was received and a response without an AckReq was sent. In this regard, the server stays in this state until a cache response timer expires.

With reference to the "Terminated" state, the Terminated state is the final state when the transaction is terminated. In this regard, the system is configured to notify the application if the transaction fails.

Referring to the flow diagram in FIG. 3, as shown, the Destination Node is initially in state Init 110. From here, at 110a, a request is received, and the request is passed to the MIH User, and if an AckReq is set, an ACK is sent. Then, the Destination Node is in the Processing State 210.

From the Processing State 210, the following can occur: a) at 210a, the same Request is received, and the ACK is sent if the AckReq is set; b) at 210b, sends Response Without AckReq and receives request with AckReq, the Cres.timer is started; c) at 210c, the response is sent with the AckReq set, and the Rtx.timer is started, with Rtx.count=0; and d) at 210d, sends response without AckReq and receives request without AckReq, and transaction is ended and proceeds to Terminated State 410.

From the Completed State 310-1, the following can occur: a) at 310-1a, receives the same Request, and sends Response; or b) at 310-1b, the cres.timer expires and the transaction ends and proceeds to Terminated State 410.

From the Completed Wait ACK State 310-2, the following can occur: a) at 310-2a, the Rtx.timer expires and Rtx.count is less than Rtx.max, the Response is retransmitted, and the Rtx.timer is started, with Rtx.count++; receives same Request, sends Response; b) at 310-2b, Rtx.timer expires and Rtx.count equals Rtx.max, the transaction is ended and proceeds to Terminated State 410; received ACK, transaction is ended and proceeds to Terminated State 410.

Figure 4:
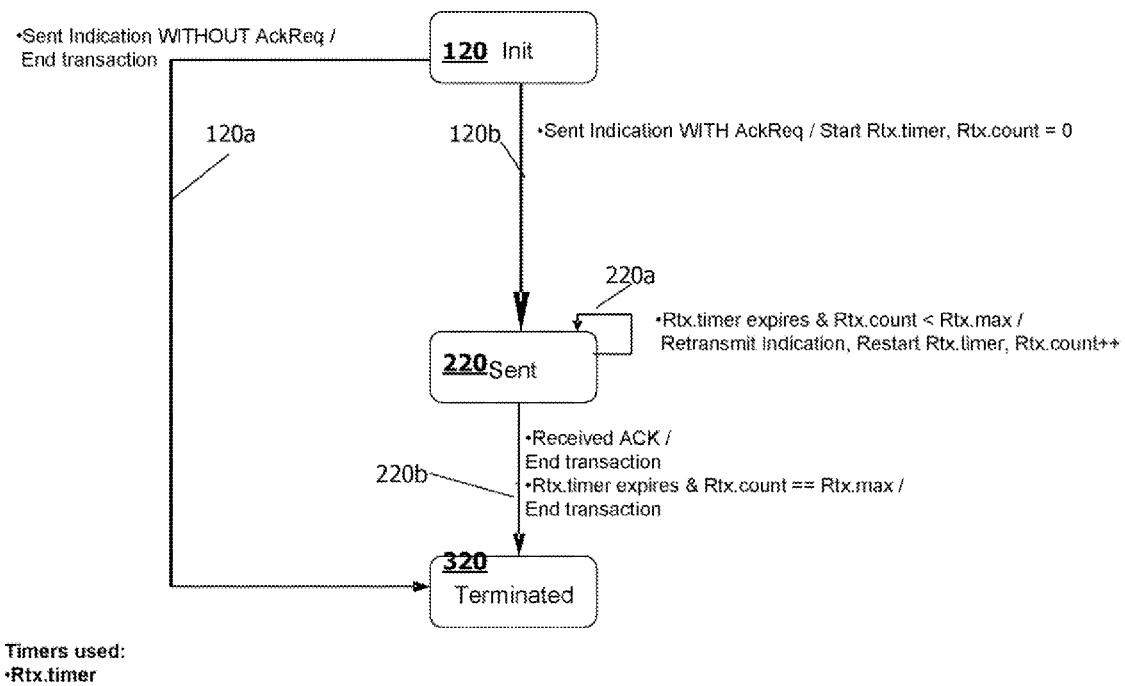
FIG. 4 is a flow diagram depicting MIH Indication Sender states according to some illustrative embodiments.

MIH Indication Sender:

With reference to FIG. 4, this figure shows states in relation to an MIH Indication Sender. In this example, an Rtx.timer is employed.

With reference to FIG. 4, the following states are depicted: Init; Sent; and Terminated.

With reference to the "Init" state, the Init state is an initial state before the transaction starts.

With reference to the "Sent" state, the Sent state is the state of which an indication with AckReq was sent. In this regard, the Indication Sender stays in this state until the ACK is received or an Abandon Timer expires.

With reference to the "Terminated" state, the Terminated state is the final state when the transaction is terminated. In this regard, the system is configured to notify the application if the transaction fails.

Referring to the flow diagram shown in FIG. 4, the MIH Indication Sender is initially in the state Init 120. Here, the following can occur: a) at 120a, an indication is sent without AckReq, and the transaction is ended and the state proceeds to Terminated State 320; or b) at 120b, an indication is sent with AckReq, and Rtx.timer starts, with Rtx.count=0, and the state proceeds to the Sent State 220.

From the Sent State 220, the following can occur: a) at 220a, the Rtx.timer expires and Rtx.count is less than Rtx.max, the Indication is retransmitted, and the Rtx.timer is restarted, with Rtx.count++; or b) at 220b, ACK is received, and the transaction is ended and proceeds to Terminated State 320; the Rtx.timer expires and the Rtx.count equals Rtx.max, the transaction is ended and proceeds to Terminated State 320.

Figure 5:
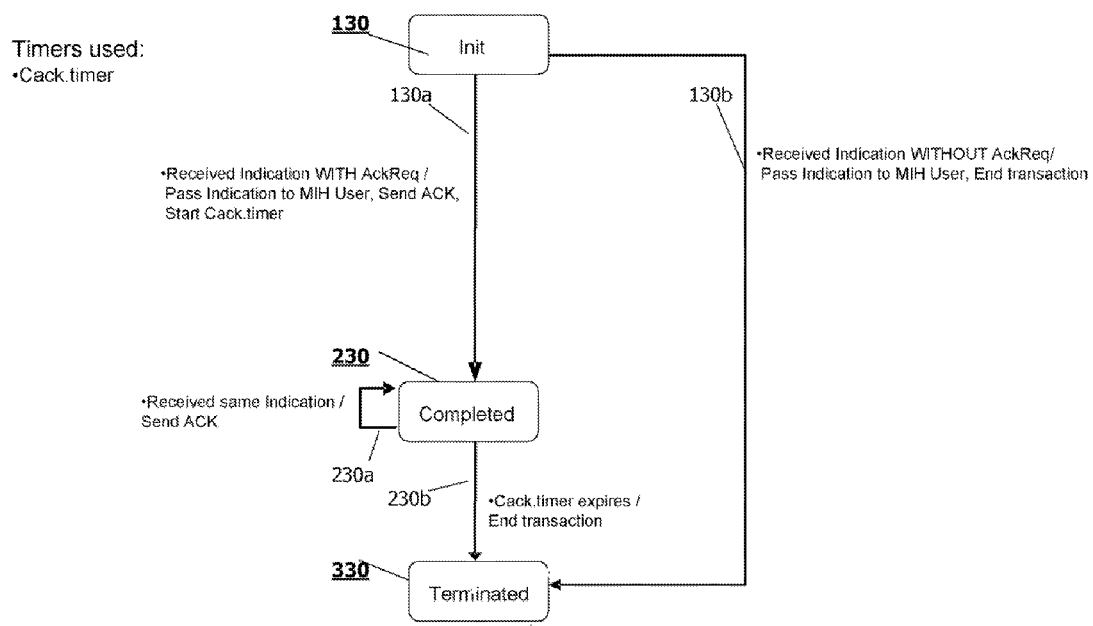
FIG. 5 is a flow diagram depicting MIH Indication Receiver states according to some illustrative embodiments.

MIH Indication Receiver:

With reference to FIG. 5, this figure shows states in relation to an MIH Indication Receiver. In this example, a Cack.timer is employed.

With reference to FIG. 5, the following states are depicted: Init; Completed; and Terminated.

With reference to the "Init" state, this state involves an initial state before the transaction starts.

With reference to the "Completed" state, this state involves a state of which an indication with an AckReq was received. In this regard, the Indication Sender stays in this state until the Cache ACK Timer expires.

With reference to the "Terminated" state, this state involves a final state when the transaction is terminated. In this regard, the system is configured to notify the application if the transaction fails.

Referring to the flow diagram shown in FIG. 5, the MIH Indication Receiver is initially in a state Init 130. Here, the following can occur: a) at 130a, an Indication can be received with an AckReq, the Indication is passed to the MIH User, an ACK is sent, and the Cack.timer is started and proceeds to Completed State 230; or b) at 130b, an Indication is received without an AckReq, the Indication is passed to the MIH User, and the transaction is ended and proceeds to Terminated State 330.

From Completed State 230, the following can occur: a) at 230a, the same Indication is received, and the ACK is sent; or b) the Cack.timer expires, and the transaction is ended and proceeds to Terminated State 330.

Figure 6:
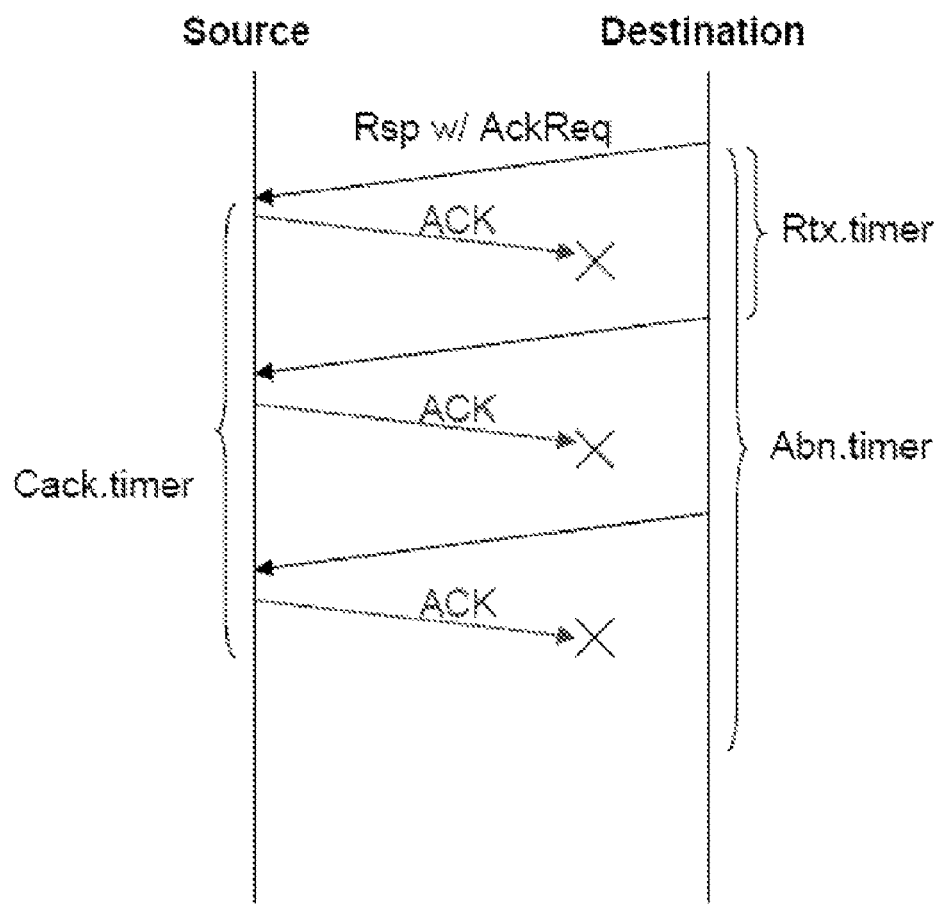
FIG. 6 is an illustrative communication flow diagram between a Source Node and a Destination Node according to some illustrative embodiments helping to demonstrate a need for a Cack Timer.

Notability of a Cack Timer:

With reference to FIG. 6, this figure shows an illustrative communication flow between a Source and a Destination that helps to demonstrate a need for a Cack Timer.

In this regard, when the MIH is transmitting over an unreliable transport and the Source fails to send the ACK to the Destination node as shown, in the preferred embodiments, the Source shall not ignore the response.

This corresponds to:

The "Completed" state described in relation to the MIH Request Sender.

The "Completed wait ACK" state described in relation to the MIH Request Receiver.

As noted above, the value of the Cache Response Timer is relevant to the Retransmission Timer RtX.Max: Cack.timer>Σ(Rtx.timer).

Further Discussions and Embodiments:

MIH Transaction State Diagram

This section describes a state diagram for a MIH transaction. In that regard, all the messages in a particular diagram have the same Transaction-ID. For brevity, the transition from any states to state 0 is omitted. For example, there may be an error or timeout in each state that can reset the complete transaction. For the accompanying figures, the following conventions are used:

MIH messages upon sent or received represent events that may cause transition of a state. These events are specified on the transition arrows in the state machine diagrams. The following abbreviations are used: Recv (Received), REQ (MIH Request Message), RSP (MIH Response Message), and ACK (MIH Acknowledgement Packet).

The different states are enumerated. In this example, the states specified with a number only (0, 1, and 2) are states that are mandatory use of a MIH protocol state machine, i.e., without the node setting ACK-Req bit. The states that are specified as a number following by a quote (e.g. 1' and 2') are additional states introduced to support the ACK capability since it is optional to use.

State Machine for MIH Request Source Node

Figure 7:
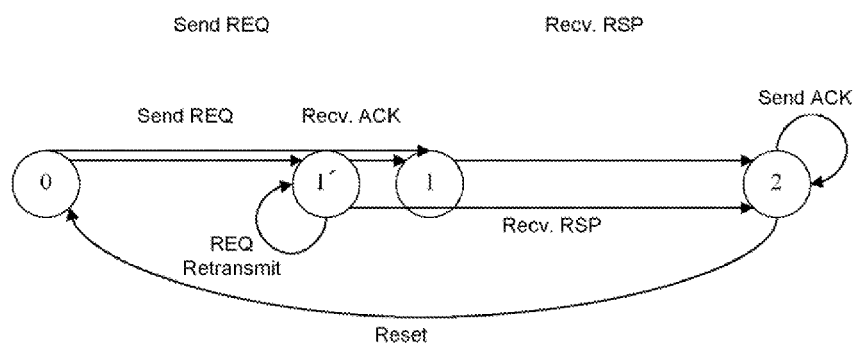
FIG. 7 is a diagram that illustrates the state transitions for an MIH transaction on the node that initiates the request, which is the MIH request source node, according to some other embodiments.

FIG. 7 illustrates the state transitions for an MIH transaction on the node that initiates the request, which is the MIH request source node.

State 0 is the initial state. If a MIH Request is sent without the ACK-Req bit set, the request source node transits to state 1. If a MIH request is sent with the ACK-Req bit set, the request source node transits to state 1' and waits for an acknowledgement packet. If an acknowledgment packet is received, the request source node will transit to state 1. Otherwise, the request source node may retransmit the MIH Request again.

In either state 1' or state 1, if a MIH Response is received, the request source node transits to state 2. If the received response does not have the ACK-Req bit set, the request source node can reset the transaction and return to state 0. However, if the MIH response has the ACK-Req bit set, the request source node shall send an acknowledgement packet. To ensure that the receiver has received the acknowledgement packet, the sender may stay in state 2 for a specific time to ensure that no retransmitted MIH Response will be received before resetting the transaction to state 0.

State Machine for MIH Request Destination Node

Figure 8:
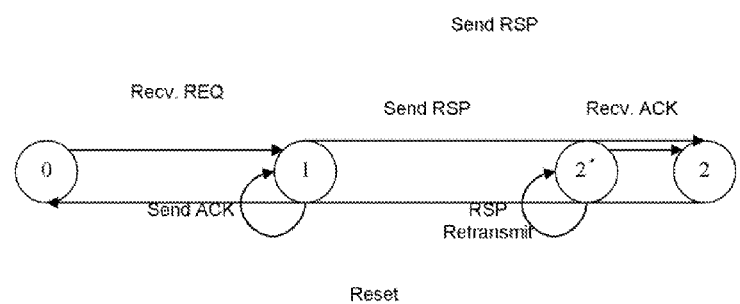
FIG. 8 is a diagram that illustrates the state transitions of a MIH transaction for a MIH request destination node, according to some other embodiments.

FIG. 8 illustrates the state transitions of a MIH transaction for a MIH request destination node.

State 0 is the initial state. When a MIH Request message is received, the request destination node transits to state 1.

If the MIH Request message does not have an ACK-Req bit set, then no action is taken with respect to the MIH protocol ACK functionality and the destination node remains at state 1. Once response is available, the destination node shall send the MIH Response message with or without the ACK-Req bit set.

If the MIH Request message has the ACK-Req bit set and the response is not immediately available, the request destination node returns an acknowledgement packet with ACK-Rsp bit set and remains in state 1. If the same MIH Request is received again during state 1, the request destination node shall respond with an acknowledgement packet. Once response is available, the destination node shall send the MIH Response message with or without the ACK-Req bit set.

If the MIH Request message has the ACK-Req bit set and the response is immediately available, the request destination node sends the MIH Response message with ACK-Rsp bit set. For cases where the ACK-Req bit is set in the MIH Request message, the MIH Response may be sent with or without ACK-Rsp bit set.

If the MIH Response is sent with the ACK-Req bit set, the request destination node transits to 2' to wait for an acknowledgement packet. If an acknowledgement packet is not received for a period of time, the request destination node may retransmit the MIH Response message. Once an acknowledgement packet is received, then the request destination node transits to state 2 and finally resets the transaction.

If the response is sent without the ACK-Req bit set, the request destination node transits to state 2. The request destination node may choose to stay at state 2 for a specific time to ensure that no duplicate MIH Request message will be processed as a new one before the transaction resets. Finally the request destination node transits to state 0 and resets the transaction.

State Machine for MIH Indication Source Node

Figure 9:
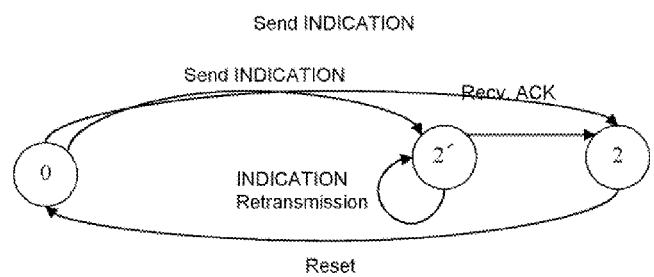
FIG. 9 is a diagram that illustrates the state transitions for a MIH indication source node, according to some other embodiments.

FIG. 9 illustrates the state transitions for a MIH indication source node. Here, state 0 is the initial state. The MIH indication source node has the option to send the indication with or without ACK-Req bit set. If a MIH Indication message is sent without the ACK-Req bit set, the indication source node is transitioned to state 2. If a MIH Indication message is sent with the ACK-Req bit set, the indication source node is transitioned to state 2' to wait for an acknowledgement packet. If an acknowledgment packet is received, the indication source node will transit to state 2 otherwise, it may retransmit the MIH indication.

Once the indication source node is in state 2, the transaction shall be reset returning to state 0.

State Machine for MIH Indication Destination Node

Figure 10:
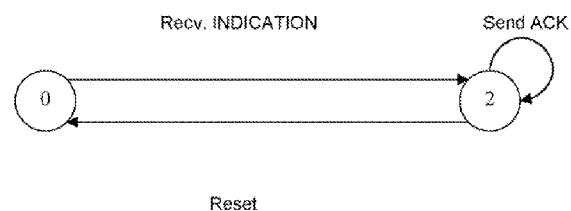
FIG. 10 is a diagram that illustrates the state transitions for a MIH indication destination node, according to some other embodiments.
Figure 11:
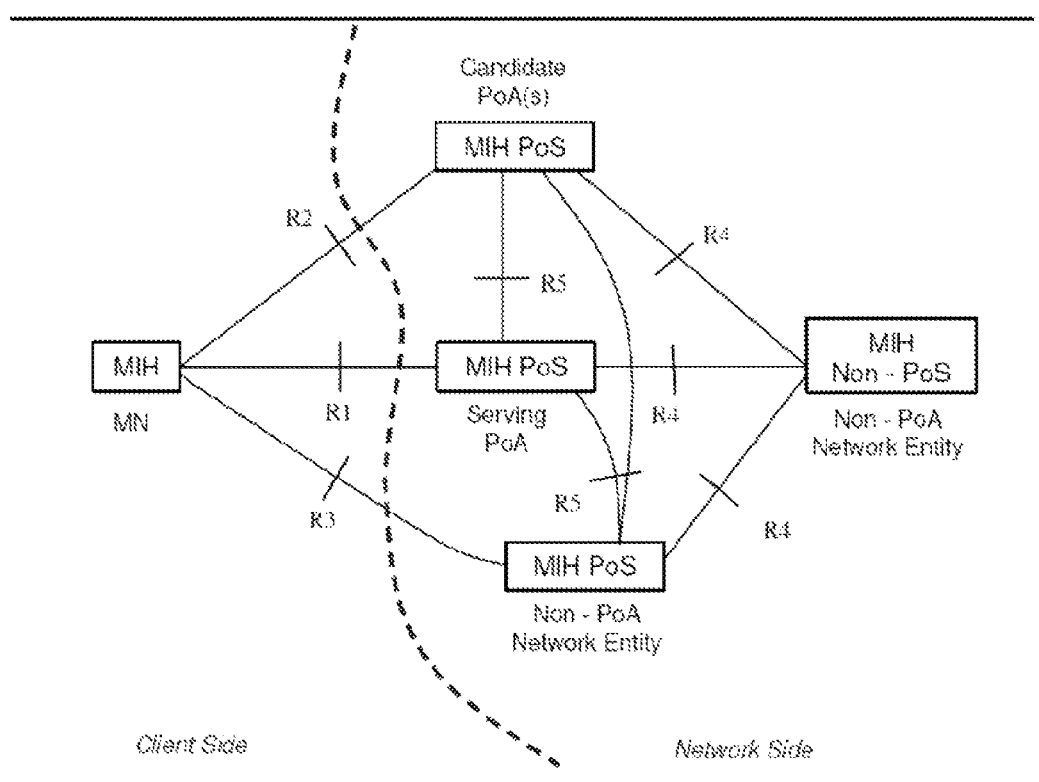
FIG. 11 shows an illustrative MIH communication model according to the illustrative background art shown in 802.21 for background and educational purposes.
Figure 12:
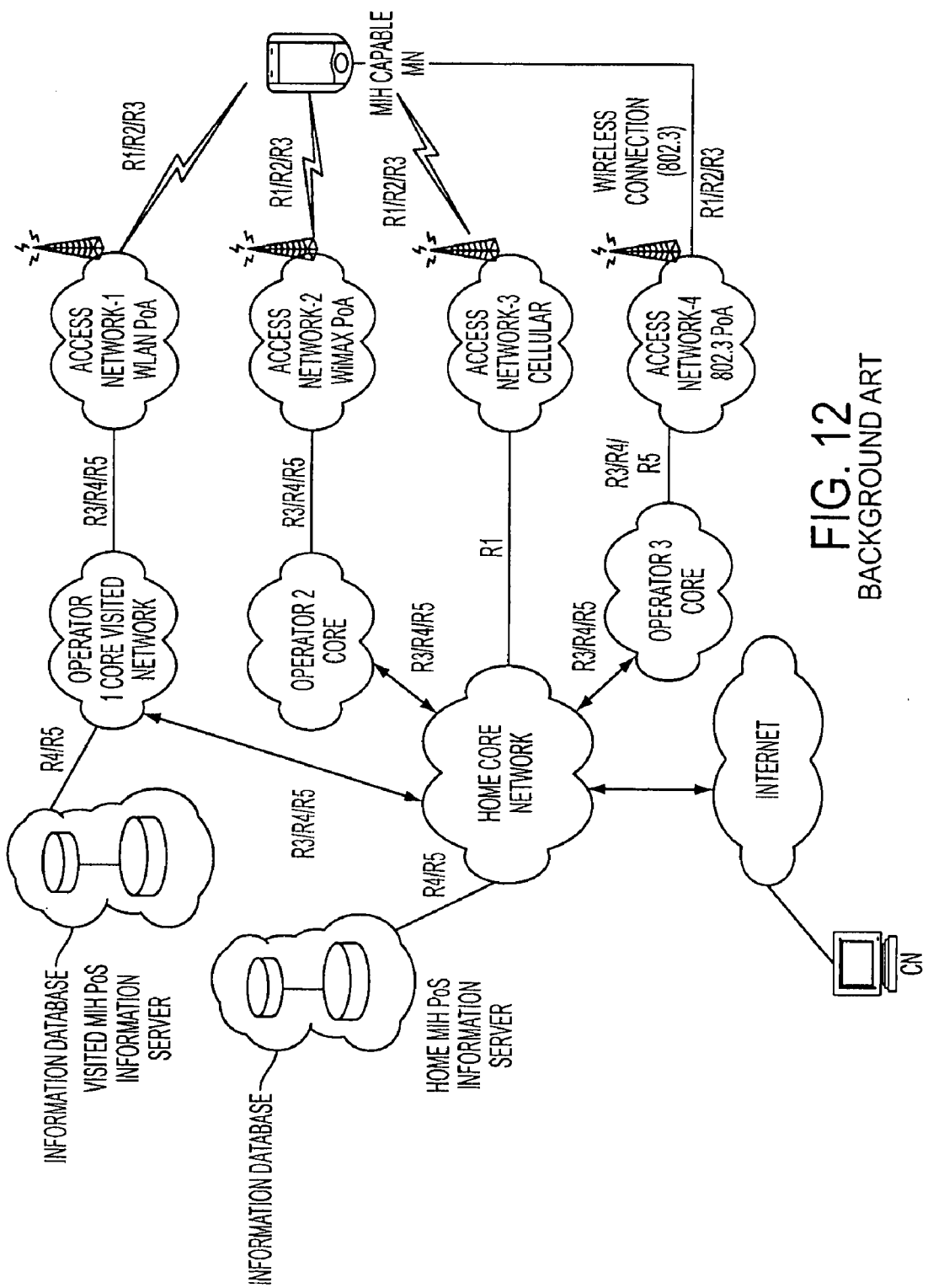
FIG. 12 is an illustrative network model including MIH services for illustration of MIH Communication Reference Points according to the illustrative background art shown in 802.21 for background and educational purposes.
Figure 13:
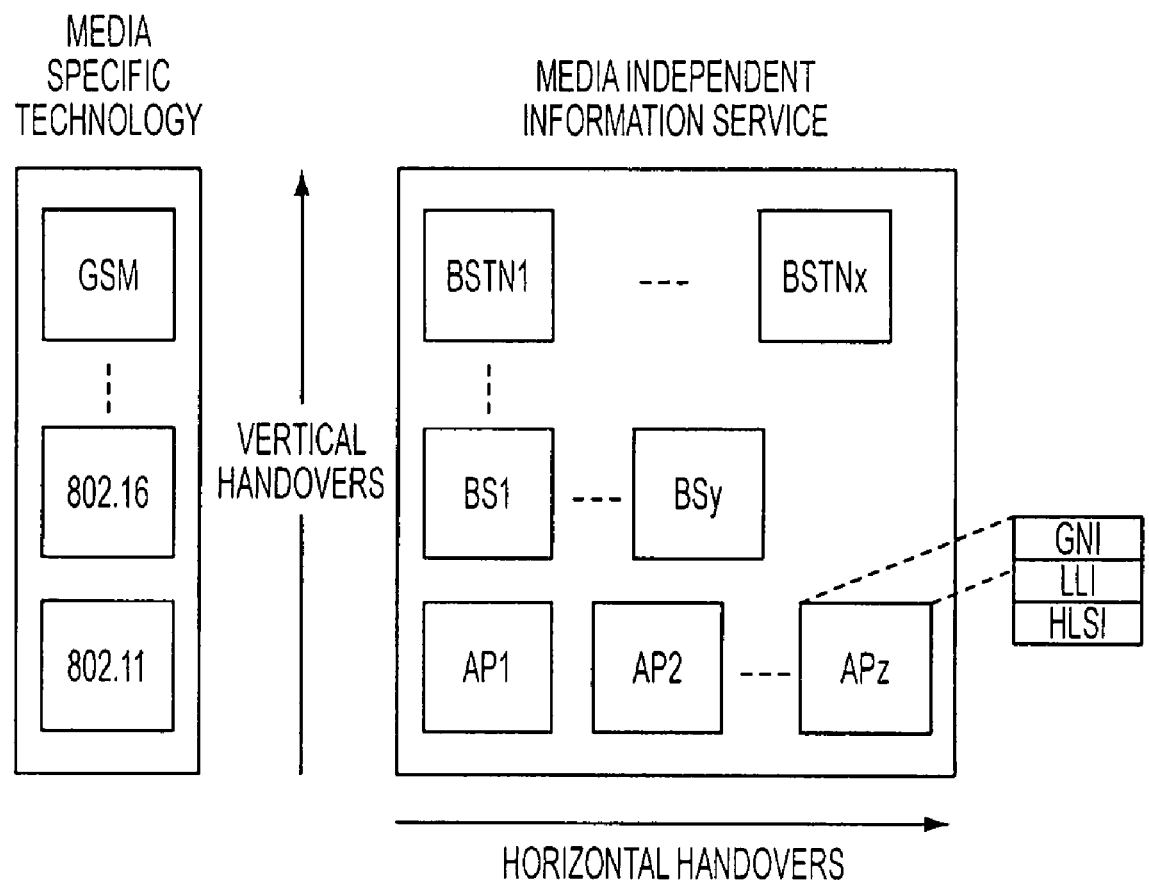
FIG. 13 shows a high level description of scenarios that distinguish between two different types of mobility according to the illustrative background art shown in 802.21 for background and educational purposes.
Figure 14:
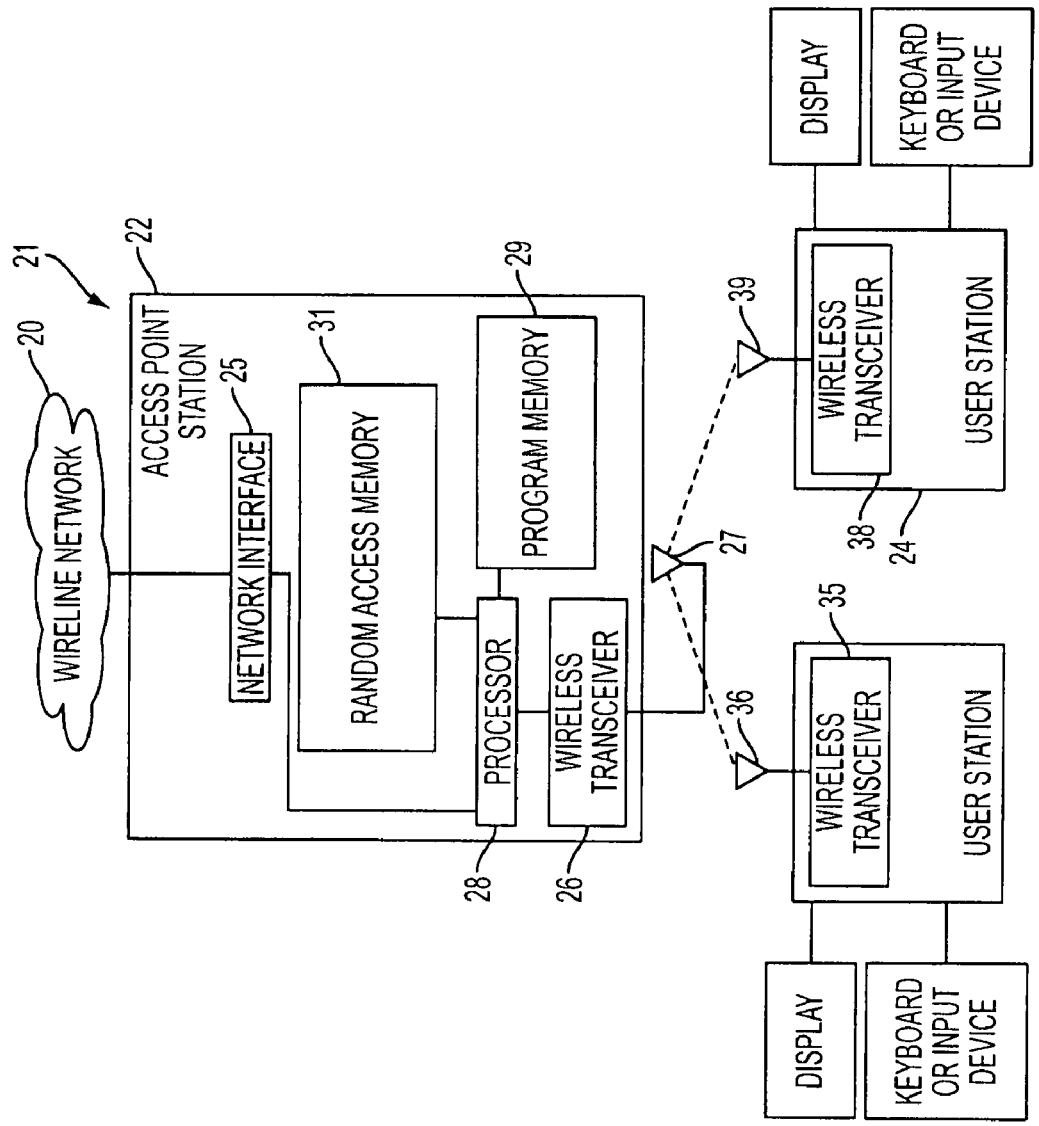
FIG. 14 is an illustrative architectural diagram demonstrating illustrative components of system architecture according to some examples.
Figure 15:
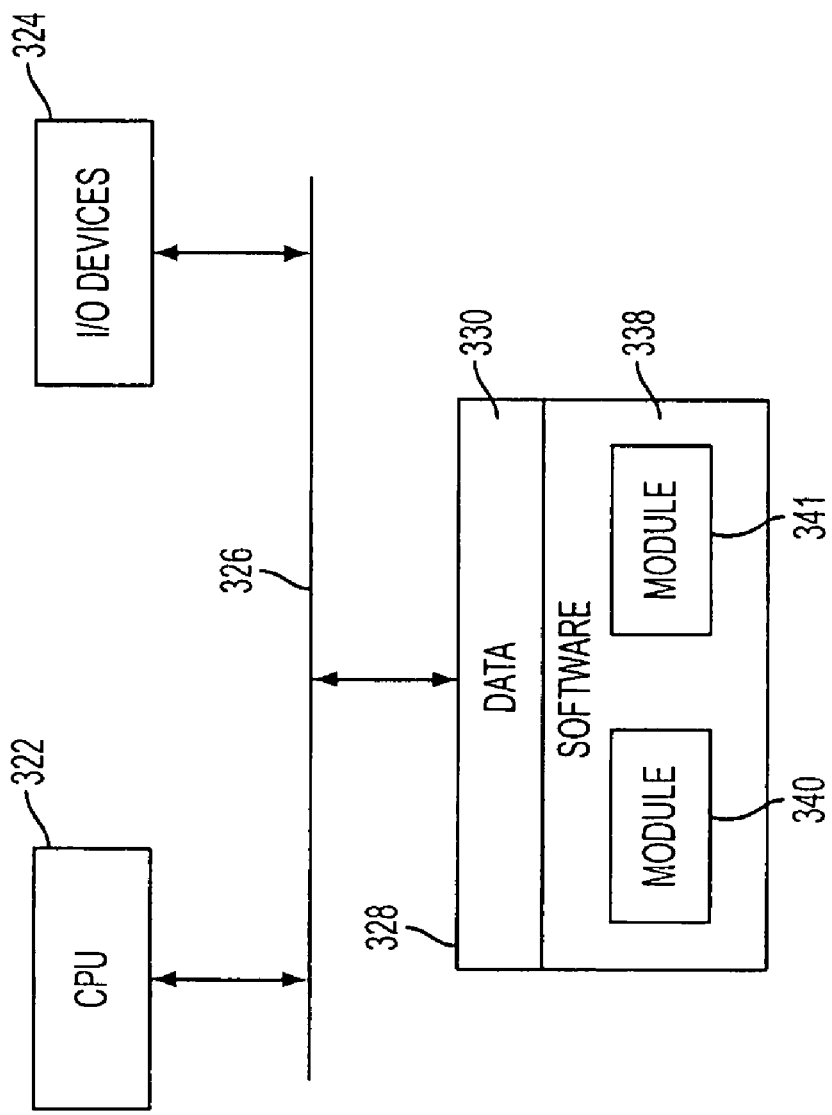
FIG. 15 shows features according to an illustrative computer or control unit that can be used to implement computerized process steps, to be carried out by devices, such as, e.g., an access point, a user station, a source node or destination node in some embodiments.

FIG. 10 illustrates the state transitions for a MIH indication destination node. Here, state 0 is the initial state. Once a MIH Indication is received, the MIH indication destination node is transitioned to state 2. If the MIH Indication is received without the ACK-Req bit set, the MIH indication destination node in state 2 transits to state 0 and resets the transaction. If the MIH indication has the ACK-Req bit set, the indication destination node shall send an acknowledgment packet to the indication source node and may wait in state 2 to ensure that if the same indication is received again, the indication destination node shall respond with an acknowledgement before transits to state 0 and resets the transaction.

Broad Scope of the Invention:

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "inventions" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example;" and "NB" which means "note well."

What is claimed is:

1. A system for facilitating media independent handover of a mobile node within or between network infrastructure, comprising:

a source node or a destination node configured with a media independent handover protocol state machine that provides states of said source node or said destination node during a transaction, said state machine addressing both requests and responses both with and without an AckReq, to address cases in which the requests have an ACK request and cases in which the requests do not have an ACK request and to address cases in which the responses have an ACK request and cases in which the responses do not have an ACK request, said state machine including an Abandon Timer that is configured to track a time to wait for a server response after a request is sent in cases where the request is sent without an ACK request and after an ACK of the request is received in cases where the request is sent with an ACK request.

2. A system for facilitating media independent handover of a mobile node within or between network infrastructure, comprising:

a source node or a destination node configured with a media independent handover protocol state machine that provides states of said source node or said destination node during a transaction, said state machine addressing both requests and responses both with and without an AckReq, to address cases in which the requests have an ACK request and cases in which the requests do not have an ACK request and to address cases in which the responses have an ACK request and cases in which the responses do not have an ACK request, wherein said state machine includes a Cache Timer that is configured to provide at least one of:

1) a Cache ACK Timer that is configured to track a time to keep the ACK of a message in memory after sending an ACK for a client or source node state; and 2) a Cache Response Timer that is configured to track a time to wait before discarding a response for a server or destination node state, and wherein said machine includes an Abandon Timer that is configured to track a time to wait for a server response after a request is sent in cases where the request is sent without an ACK request and after an ACK of the request is received in cases where the request is sent with an ACK request.

3. The system of claim 2, wherein a value of the Cache Timer is relevant to a retransmission timer as follows:

$$\text{Cache Timer}(\text{Cache } ACK \text{ Timer or Cache Response Timer}) > \sum_{0}^{Rtx.Max} (Rtx.timer)$$

where Rtx.timer is a retransmission timer that is configured to track the time to wait for an ACK before retransmitting a message, and where Rtx.Max is the maximum number of retransmissions.

4. The system of claim 1, wherein said state machine is configured to address transactions in both MIH protocol operation and in session operation.

5. The system of claim 1, wherein said state machine includes an MIH Request Sender state machine component that employs a Retransmission Timer, an Abandonment Timer configured to track a time to wait for a server response after a request is sent or after an ACK of the request is received, and a Cache ACK Timer that is configured to track a time to keep an ACK of a message in memory after sending an ACK.

6. The system of claim 1, wherein said state machine is configured to establish the following MIH Request Sender states: Init; Sent; Processing; Completed and Terminated.

7. The system of claim 1, wherein said state machine is configured such as to provide a Sent state of which a request message is sent, and such that the sender stays within this Sent state if a message needs to be retransmitted.

8. The system of claim 7, wherein said state machine is configured such that the Sent state is transited once the sender receives a message from the server or abandons the request.

9. The system of claim 1, wherein said state machine is configured such as to provide a Completed state in which a response with an AckReq was received.

10. The system of claim 9, wherein the sender stays within this Completed state until a Cache ACK Timer, that is configured to track a time to keep the ACK of a message in memory after sending an ACK, expires.

11. A system for facilitating media independent handover of a mobile node within or between network infrastructure, comprising:
a source node or a destination node configured with a media independent handover protocol state machine that provides states of said source node or said destination node during a transaction,
said state machine addressing requests and responses both with and without an AckReq, to address cases in which the requests have an ACK request and cases in which the requests do not have an ACK request and to address cases in which the responses have an ACK request and cases in which the responses do not have an ACK request,
wherein said state machine includes a MIH Request Receiver state machine that employs a Retransmission Timer and a Cache Response Timer that is configured to track a time to wait before discarding a response, and
wherein said machine includes an Abandon Timer that is configured to track a time to wait for a server response after a request is sent in cases where the request is sent without an ACK request and after an ACK of the request is received in cases where the request is sent with an ACK request.

12. The system of claim 1, wherein said state machine is configured to establish the following MIH Request Receiver states: Init; Processing; Completed; Completed Wait ACK and Terminated.

13. The system of claim 1, wherein said state machine is configured such as to provide a Processing state of which a request was received, and wherein if the same request is received again, the receiver stays in this state, and wherein the state is transited when a response is sent.

14. The system of claim 1, wherein said state machine is configured such as to provide a Completed Wait ACK state of which a response with an AckReq was sent, and wherein the receiver stays within this state until an ACK is received or a re-transmission mechanism is timed out.

15. A system for facilitating media independent handover of a mobile node within or between network infrastructure, comprising:
a source node or a destination node configured with a media independent handover protocol state machine that provides states of said source node or said destination node during a transaction,
said state machine addressing requests and responses both with and without an AckReq, to address cases in which the requests have an ACK request and cases in which the requests do not have an ACK request and to address cases in which the responses have an ACK request and cases in which the responses do not have an ACK request,
wherein said state machine is configured such as to provide a Completed state of which a request with an AckReq was received and a response without an AckReq was sent, and
wherein the receiver stays in this state until a Cache Response Timer, that is configured to track a time to wait before discarding a response for a server state, expires, and
wherein said machine includes an Abandon Timer that is configured to track a time to wait for a server response after a request is sent in cases where the request is sent without an ACK request and after an ACK of the request is received in cases where the request is sent with an ACK request.

16. The system of claim 1, wherein said state machine is configured such as to provide states for indication source and/or receiver nodes in relation to sending of messages with and without an AckReq bit set.

17. The system of claim 16, wherein said state machine is configured such that if an MIH Indication message is sent without the AckReq bit set, the indication source node is transited to a first state, while if the MIH Indication message is sent with the AckReq bit set, the indication source node is transited to a second state to wait for an acknowledgement and upon receipt of said acknowledgement the indication source node transits to the first state.

18. The system of claim 16, wherein said state machine is configured such that once an MIH indication is received, the MIH Indication destination node transits to a first state, and if the MIH Indication is received without an AckReq bit set, the MIH Indication destination node transits to a second state and resets the transaction, while if the MIH indication is received with an AckReq bit set, the MIH Indication destination node sends an acknowledgement to the MIH Indication source node and waits in the first state to ensure if the same indication is received again.

19. A method for facilitating media independent handover of a mobile node within or between network infrastructure, comprising:
with a source node or a destination node having a media independent handover protocol state machine providing states of said source node or said destination node during a transaction, said state machine addressing both requests and responses both with and without an AckReq, to address cases in which the requests have an ACK request and cases in which the requests do not have an ACK request and to address cases in which the responses have an ACK request and cases in which the responses do not have an ACK request,
said state machine including an Abandon Timer that is configured to track a time to wait for a server response after a request is sent in cases where the request is sent without an ACK request and after an ACK of the request is received in cases where the request is sent with an ACK request and a Cache Timer that is configured to track at least one of:
1) a time to keep the ACK of a message in memory after sending an ACK for a client state; and
2) a time to wait before discarding a response for a server state.

* * * * *